Patented May 13, 1941

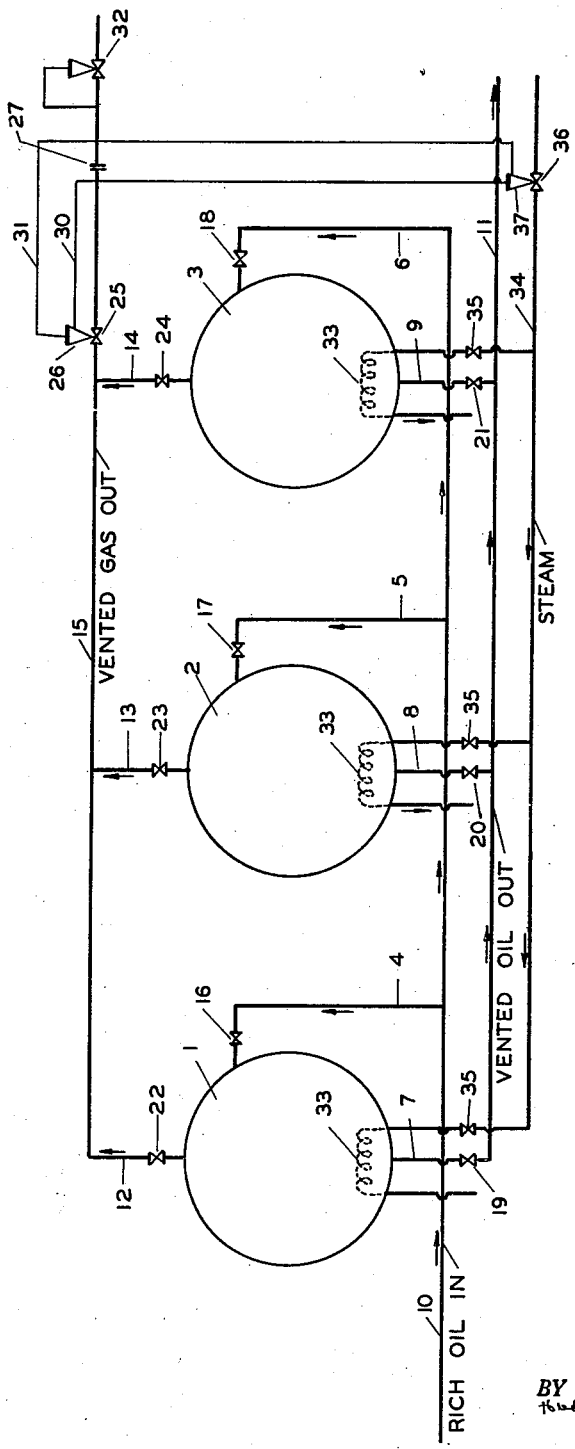

2,242,110

UNITED STATES PATENT OFFICE 2,242,110

METHOD AND APPARATUS FOR TREATING HYDROCARBONS

Samuel C. Carney, Bartlesville, Okla., assignor to Phillips Petroleum Company, a corporation of Delaware Application January 12, 1938, Serial No. 184,678

3 Claims. (Cl. 183—114.5)

This invention relates to an apparatus and method of controlled evolution of volatile components from an ebullient liquid.

In many processes it becomes necessary to separate a dissolved gas from a liquid. One example of such a problem is in the recovery of desirable components from a hydrocarbon gas in which process due to the phenomena of preferential absorption of one component over another the gas is contacted with an absorption liquid in an absorption zone and later the pressure on the absorption liquid is lowered or its temperature raised to evolve the dissolved gas. This last step is called venting, flashing, or distillation. Batch distillation or venting, wherein the liquid is charged into a receptacle, and the temperature or pressure or both gradually changed to evolve the desirable components, is best in principle. In present day processing, however, greater output per labor cost and capital investment has made continuous processing mandatory. In continuous processing the liquid flows continually through the vent tank or still, the pressure or temperature being maintained constant. In the case of continuously processing by venting if the liquid flows through successive zones of increasingly lower pressure the process is called stage venting or flashing. Batch or intermittent processing has been generally abandoned although best in principle because it involved a cycle of (1) charging, (2) operation, and (3) shutdown which was wasteful of labor and equipment. On the other hand continuous processing though somewhat faulty in principle has not the wasteful characteristics of the batch system.

The present invention while retaining the batch principle operates continuously, to attain the maximum theoretical advantage. As applied to venting, a plurality of vent tanks are used simultaneously some being charged with liquid while others are discharging and still others venting only. The control of pressure in those tanks venting is such as to produce maximum vaporization.

An important object of the invention is to provide a process for obtaining controlled vaporization of volatile components from a liquid.

A further important object of the invention is the provision of a process of vaporization which combines the batch principle and the continuous process principle.

A still further important object of the invention is the provision of a vaporization process in which the pressures and temperatures to which the liquid is exposed are proportional to the amount of vaporization.

Referring to the accompanying drawing forming a part of this specification, a system is diagrammatically shown which embodies the present invention.

Reference numerals 1, 2, and 3 designate vessels or tanks of equal capacity each having inlet pipes 4, 5, 6, respectively and discharge pipes 7, 8, 9, respectively. Inlet pipes 4, 5, 6, are connected to a common feeder pipe 10 which carries rich oil and withdrawal or discharge pipes 7, 8, 9, are connected to a common discharge pipe 11 carrying lean oil. At the top of each tank 1, 2, 3, are vent pipes 12, 13, 14, respectively, which are connected to common vent gas line or manifold 15. Interposed in inlet pipes 4, 5, 6, are valves 16, 17, 18, respectively, in discharge pipes 7, 8, 9, valves 19, 20, 21, respectively, and in vent pipes 12, 13, 14, valves 22, 23, 24 respectively. All the valves so far mentioned can be of the full open or full closed type. Valve 25 in vapor discharge line 15 is of the throttling type and operable by diaphragm or other desirable motor 26. In the embodiment illustrated motor 26 is of the diaphragm type and operated in accordance with the pressure differential across orifice 27 through two differential control lines 30 and 31. A back pressure regulator valve is shown generally at 32 designed to hold a uniform downstream static pressure on orifice 27.

In operating with the structure described, rich oil or any other liquid to be vented is present at all times in feeder pipe 10. Assuming the system has been operating, one of the tanks 1, 2, 3, will be filling, another venting and the third emptying. It is to be understood that more than three tanks could be used to carry out the invention but for the sake of simplicity in this disclosure only three, the least possible number, are shown. The sequence of action can be as follows: tank 1 is filling, tank 2 emptying, and tank 3 venting, these functions, of course, being controlled by the valve shown. Thus valves 19 and 22 are closed, valve 16 open, valve 20 open, valves 17 and 23 closed, valves 21 and 18 closed, and valve 24 open. Control valve 25 operates regardless of whether or not valves 22, 23, 24 are open or closed but in accordance with the pressure drop across orifice 27. The motor of valve 25 in the case of venting is designed to increase the throttling action with increase of pressure drop across orifice 27. It is thus apparent that when the tank to be vented is first connected to manifold 15 by opening one of the valves 22, 23 or 24, there will be a sudden drop of pressure on the liquid, limited by back pressure regulator 32.

Methane will be evolved in large quantities but in flowing through orifice 27 a high pressure drop will be present which these control lines 30 and 31 will apply to throttling valve 25 bringing into effect the throttling action of this valve. As a result the flow of vapor through discharge line 15 remains substantially constant and the pressure on the tank venting gradually declines. When a predetermined venting period has elapsed, valve 24 is closed and valve 21 opened to discharge the vented liquid. By this time tank 1 is filled and ready to vent. Valve 16 is closed and valve 22 opened. Tank 2 is empty of vented liquid so valve 20 is closed and valve 17 opened to fill the tank with liquid to be vented. The venting period of course is normally the limiting factor, the filling and emptying steps taking the same time through design of the valves in the liquid lines.

The main purpose of the applicant's process is to separate methane and any other undesirable gas from the absorption liquid. The absorption liquid, still rich in other dissolved vapors, goes from the applicant's process to further processing such as stripping, either by further pressure reduction or by distillation, or both. It is known that when rich absorption liquid under relatively high pressure is passed through a venting zone, at reduced pressure, the ratio of the heavy components evolved as vapor to light components evolved increases as the pressure is reduced. Thus, in the prior practice where the absorption liquid was continuously passed through a venting zone at a pressure greatly below that of the absorption zone, a large amount of the heavy absorbed components in the absorption liquid were evolved together with the methane. In the applicant's process, however, by subjecting an isolated body of the rich absorption liquid to a gradually decreasing pressure in the presence of the evolved components and proportional to the rate of evolution, the percentage of methane in the evolved vapors is considerably higher than in the above mentioned prior practice. There is thus a selective elimination of methane from the rich absorption liquid with advantages well known in the art. Since this method of venting requires that an isolated body of absorption liquid be treated, it follows that in order for the method to be practicable in present day practice, it must be made continuous. To this end the three tanks and the associated piping system developed by the applicant is used to present a continuous method.

It will be obvious from the above that the composition of the evolved mixture of vapors can be determined within limits by the time required to reduce the pressure of the absorption liquid to the desired point. This time period in turn is controlled by the rate at which the vapors are withdrawn or in other words the degree of throttling of valve 25.

In those cases where the liquid to be treated is not readily vaporized by reduction in pressure this invention contemplates the addition of heat with or without pressure control. For this purpose, heating elements of any desired type, steam coil 33 being shown, are used to raise the temperature of the liquid. A steam supply line is shown at 34 having inlet branches to each steam coil, each branch having a valve 35 for isolating those coils in the tanks being filled or emptied. A throttling control valve 36 is interposed in steam line 34 and is operated by a motor 37 in response to the pressure differential across orifice 27. With no pressure differential across orifice 27 valve 36 is in its most open position.

The tank containing the liquid to be vented, or more properly distilled, in this case is supplied with heat in accordance to the flow of vapor past orifice 27. With no flow past this point steam is admitted under maximum pressure to the steam coil, causing ebullition of the liquid and evolution of vapor. This vapor passing orifice 27 by its quantity controls the amount of heat supplied to the liquid. Valves 25 and 32 can be disconnected or not depending on the conditions desired.

I claim:

1. A method of controlling the evolution of a dissolved gas from a liquid under pressure, the liquid containing other normally gaseous but less volatile components comprising directing a continuous stream of the liquid under pressure to one of a plurality of vessels, subsequently directing the stream to a second vessel and isolating the first vessel, gradually reducing the pressure on the liquid in the first vessel to a desired point by withdrawing evolved vapors at a substantially constant rate, subsequently directing the stream to a third vessel and isolating the second vessel, gradually reducing the pressure on the liquid in the second vessel to the above point by withdrawing the evolved vapors at a substantially constant rate, while emptying the first vessel, and subsequently directing the stream to the first vessel and isolating the third vessel, gradually reducing the pressure on liquid in the third vessel to the above point while emptying the second vessel, the period of time required for reducing the pressure on each vessel controlling the period of time taken for filling and emptying the other two vessels.

2. A system for controlling the evolution of volatile components from an ebullient liquid comprising three vessels, a liquid feeder pipe, a liquid inlet pipe for each vessel connected to the liquid feeder pipe, a liquid discharge pipe, liquid withdrawal pipes for each vessel connected to the liquid discharge pipe, valves in each of the liquid inlet and liquid withdrawal pipes for controlling the same, a discharge conduit for evolved components associated with each vessel, a discharge line connected with the discharge conduits, a valve in each discharge conduit for controlling the same, valve means for controlling the flow of evolved components through the discharge line, and fluid flow response means associated with the discharge line for controlling said valve means in accordance with the quantity of evolved components flowing in the discharge line to maintain the flow of vapors substantially constant.

3. A method of controlling the evolution of dissolved gases from a continuous stream of hydrocarbon liquid under high pressure, the liquid containing other normally gaseous but less volatile components which it is desired to retain in solution, comprising directing the stream consecutively to a plurality of vessels, reducing the pressure on each vessel after the stream of liquid is directed to the next vessel, the reduction in pressure being continuous over a period of time sufficient to obtain maximum evolution of the dissolved gas with minimum evolution of the less volatile components, the rate of pressure reduction being controlled by the amount of vapor evolved, discharging the liquid from each vessel before the pressure therein has reached a point at which less volatile components are evolved in appreciable quantity, and again directing the stream of liquid to the empty vessel.

SAMUEL C. CARNEY.